United States Patent
Moore, IV

(10) Patent No.: US 11,161,934 B2
(45) Date of Patent: Nov. 2, 2021

(54) PROCESS FOR MANUFACTURING POLYESTER RESINS

(71) Applicant: Auriga Polymers, Inc., Charlotte, NC (US)

(72) Inventor: Banks McIlvain Moore, IV, Huntsville, AL (US)

(73) Assignee: Auriga Polymers, Inc., Charlotte, NC (US)

( * ) Notice: Subject to any disclaimer, the term of this patent is extended or adjusted under 35 U.S.C. 154(b) by 72 days.

(21) Appl. No.: 16/473,189

(22) PCT Filed: Jan. 2, 2018

(86) PCT No.: PCT/US2018/012055
§ 371 (c)(1),
(2) Date: Jun. 24, 2019

(87) PCT Pub. No.: WO2018/128978
PCT Pub. Date: Jul. 12, 2018

(65) Prior Publication Data
US 2020/0095373 A1 Mar. 26, 2020

Related U.S. Application Data

(60) Provisional application No. 62/443,373, filed on Jan. 6, 2017.

(51) Int. Cl.
*C08G 63/183* (2006.01)
*B29B 9/06* (2006.01)
*C08G 63/81* (2006.01)
*B29K 67/00* (2006.01)

(52) U.S. Cl.
CPC ............ *C08G 63/183* (2013.01); *B29B 9/065* (2013.01); *C08G 63/81* (2013.01); *B29K 2067/00* (2013.01); *C08G 2250/00* (2013.01)

(58) Field of Classification Search
CPC .. C08G 63/183; C08G 2250/00; C08G 63/78; C08G 63/81; C08G 63/88; B29B 9/065; B29K 2067/00
See application file for complete search history.

(56) References Cited

U.S. PATENT DOCUMENTS

| | | | |
|---|---|---|---|
| 3,041,011 A * | 6/1962 | Dhanes | F41G 7/343 244/3.17 |
| 4,223,128 A * | 9/1980 | Halek | B29B 9/16 528/308.2 |
| 7,192,545 B2 | 3/2007 | Ekart et al. | |
| 7,579,428 B2 | 8/2009 | Jernigan | |
| 8,063,176 B2 | 11/2011 | Hally et al. | |
| 8,987,408 B2 | 3/2015 | Jernigan | |
| 9,062,200 B2 | 6/2015 | Colhoun et al. | |
| 2006/0047103 A1 * | 3/2006 | Armentrout | B01J 8/1836 528/272 |
| 2006/0287472 A1 * | 12/2006 | Jernigan | C08G 63/866 528/272 |
| 2007/0219341 A1 * | 9/2007 | Hally | B01J 19/0066 528/272 |
| 2020/0095373 A1 * | 3/2020 | Moore, IV | C08G 63/78 |

FOREIGN PATENT DOCUMENTS

EP 0520447 A1 12/1992

OTHER PUBLICATIONS

International Search Report for International Application No. PCT/US2018/012055 dated May 1, 2018.
Rossari "What is Oligomer", p. 1, https://web.archive.org/web/20130514023520/http://www.fibrefashion.com/product_launch/rossera/troubleshoot.htm.

* cited by examiner

*Primary Examiner* — Ling Siu Choi
*Assistant Examiner* — Gennadiy Mesh
(74) *Attorney, Agent, or Firm* — Nexsen Pruet, PLLC; Seth L. Hudson

(57) ABSTRACT

A method of making a non-solid state polyester that includes: a) reacting terephthalic acid and ethylene glycol; b) removing the water continuously; c) polymerizing the monomers and oligomers in vacuum conditions at a temperature to form molten polyester having an IV (intrinsic viscosity) of about 0.7 to 0.85 dl/g; d) extruding the molten polyester through a die; e) cutting and quenching the molten polyester, forming polyester pellets; f) drying the polyester pellets and transferring the polyester pellets to a storage vessel; g) transferring the polyester pellets to the upper end of a conditioning vessel while a countercurrent flow of air is circulated through the polyester pellets; and h) transferring the polyester pellets to the top of a crystallizer vessel to form a bed of polyester pellets flowing by gravity towards the bottom of the vessel while a countercurrent flow of nitrogen is circulated through the bed, and heating the polyester pellets, wherein increase of the IV of the polyester pellets is less than about 0.01 to 0.015 dl/g and the polyester pellets have a crystallinity greater than about 52%.

2 Claims, No Drawings

US 11,161,934 B2

PROCESS FOR MANUFACTURING POLYESTER RESINS

CROSS REFERENCE TO RELATED PATENT APPLICATION

The present non-provisional patent application claims priority to PCT/US2018/012055 filed on Jan. 2, 2018 which claims priority to U.S. Provisional Patent Ser. No. 62/443,373 filed Jan. 6, 2017 and entitled "PROCESS FOR MANUFACTURING POLYESTER RESINS," the contents of which are incorporated by reference herein.

FIELD OF THE INVENTION

This invention is directed at a process for crystallizing non-solid state polymerized polyester resins to improve the extrusion of such resins to manufacture articles using standard screws designed for solid state polymerized resins, and to reduce the amount of oligomers in such articles.

BACKGROUND OF THE INVENTION

Polyethylene terephthalate (PET) resins for articles requiring high molecular weight, intrinsic viscosity (IV) of about 0.8 to about 0.9 dl/g, such as high tenacity filament yarns, bulked continuous carpet yarns and food containers have traditionally been produced by first a melt phase polymerization process followed by a solid state polymerization process. In solid state polymerization (SSP), a low molecular weight PET, IV of about 0.5 to about 0.6 dl/g, is first made by a melt phase process, the melt is extruded into strands through a die, quenched in water, and cut into cylindrical shaped pellets. The PET pellets are then fed continuously through a crystallizer at a temperature of about 180° C., followed by a solid state polymerization (SSP) reactor in which hot nitrogen flows countercurrent to the flow of the pellets at a temperature below the melting point of the PET pellets, typically 220 to 240° C., for about 8 to about 14 hours. The solid state polymerization continues until the IV target is reached. The long residence times in solid stating produces a high level of crystallinity in the resins, with a crystallinity gradient decreasing from the surface to the center of the pellet. The melting point of these highly crystalline resins is about 240° C. This SSP process also reduces the oligomer content of the final high IV product, these oligomers being removed by the countercurrent of nitrogen that flows through the SSP reactor.

New designs of melt phase high polymerizer reactors now allow high IV polyester resins to be obtained in the melt phase without any subsequent solid phase polymerization. This non-solid state polymerization process is typically called the "melt to resin" process (MTR). These MTR processes are described in U.S. Pat. Nos. 7,329,723, 7,674,877, 7,786,247, 7,868,125, 8,877,107 and 9,346,191 for instance. A common feature is that crystallization of these resins normally occurs from the heat retained in the material after the pelletization and drying process (latent heat crystallization). The melting point and total crystallinity are much lower than traditional solid state polymerized resins, e.g. a crystallinity of about 48% vs. greater than about 55% in SSP resins. In contrast to SSP resins, the crystallinity in MTR resins is highest in the center of the pellet. The typical melting curve of MTR PET resins as measured by DSC begins in the range from about 205 to 230° C.

Melt processing conditions have been developed for traditional solid state polymerized polyester resins i.e. screw design for extruders and injection molding machines, operating temperatures, throughput rates or screw speed, and the like. The optimum melt processing conditions allow maximum production rate of articles such as fibers, preforms or sheet with minimal quality defects. Due to the differences in melting point and crystallinity of MTR resins compared to SSP resins, the use of equipment and process conditions for SSP resins are not optimum for MTR resins. Optimized melt processing conditions have to be developed for MTR resins to take advantage of the lower energy required to melt MTR resins, and reduce bubble and unmelt defects observed when MTR resins are processed on the traditional injection screws designed for SSP resins. However, the lack of a SSP process in the MTR process does not decreases the oligomer content of the resin, which can lead to spinning and dyeing problems of fabrics and carpet fibers spun from MTR resins.

Better processing conditions for MTR resins can be accomplished, for instance, by using a screw design as disclosed in U.S. Pat. No. 8,057,726, which allows a lower temperature extrusion process to be developed. However, many customers for high IV polyester resins switch between suppliers offering standard SSP resins or MTR resins. There is therefore a need for a resin, made from a MTR process, to extrude with the standard screw, as used for a SSP resin, without any defects in the extruded article, and with lower oligomer content.

SUMMARY OF THE INVENTION

One embodiment of the invention is to add a crystallizer to a polyester MTR process to provide a crystallinity and oligomer content comparable with a SSP resin.

Another embodiment of the invention is a non-solid state polymerized polyester resin having crystallinity greater than about 50%.

Yet another embodiment of the invention is a non-solid state polymerized polyester resin having an oligomer content of less than about 0.5 weight % of the polyester.

DETAILED DESCRIPTION OF THE INVENTION

The polyester polymer of the invention contains ethylene terephthalate repeat units in the polymer chain. The polyester polymer comprises:
(a) a carboxylic acid component comprising at least 80 mole %, at least 90 mole percent, at least 92 mole percent, at least 93 mole percent, or at least 96 mole percent of the residues of terephthalic acid or derivatives of terephthalic acid, or mixtures thereof, and
(b) a hydroxyl component comprising at least 80 mole %, at least 90 mole percent, at least 92 mole percent, at least 93 mole percent, or at least 96 mole percent of the residues of ethylene glycol,
based on 100 mole percent of carboxylic acid component residues and 100 mole percent of hydroxyl component residues in the polyester polymer.

Typically, polyesters such as polyethylene terephthalate are made by reacting a diol such as ethylene glycol with a dicarboxylic acid as the free acid or its dialkyl ester to produce an ester monomer and/or oligomers, which are then polycondensed to produce the polyester.

The MTR continuous production of PET comprises reacting terephthalic acid and ethylene glycol at a temperature of approximately 200° to 250° C. forming monomer and water. Because the reaction is reversible, the water is continuously removed, driving the reaction to the production of monomers and some oligomers. Next the monomers and oligomers undergo polycondensation reaction in vacuum conditions at a temperature of about 250° to 290° C. to form polyester having an IV of about 0.7 to 0.85 dl/g. During the esterification reaction, no catalyst is needed. However, in the polycondensation reaction, a catalyst such as an antimony, germanium, titanium or aluminum compound, optionally with a co-catalyst is necessary.

Once the polyester polymer is manufactured in the melt phase polymerization, it is solidified. The method for solidifying the polyester polymer from the melt phase process is not limited. Preferably, the molten polyester polymer from the melt phase is directed through a die and cut with an underwater cutter. The pellets are only solidified on the surface before being dried with a centrifugal dryer. The hot pellets, about 165° C., are transferred to the top of a storage vessel where the pellets are maintained at about this temperature with a slow flow of hot air in order for the pellets to complete crystallization (to about 25%) by their internal latent heat as they fall by gravity to the bottom of the vessel, with a residence time of about 15 to 60 minutes. The pellets are then transferred to the top of a conditioning vessel where a countercurrent flow of ambient air removes at least a portion of the residual acetaldehyde and other volatile products from the pellets as they fall to the bottom by gravity. This conditioning process is designed not to solid state polymerize the pellets to a higher IV, but raises the crystallinity to about 48%. The pellets are cooled at the bottom of this conditioning vessel, after a residence time of about 5 to 30 hours, and the resin transferred to a product storage silo.

PET is also made in MTR continuous processes from the reaction of an ester of terephthalic acid and ethylene glycol, at a reaction temperature of approximately 190° to 230° C. forming alcohol and monomer. This esterification reaction is reversible and the alcohol must be continuously removed, driving the reaction to the production of monomer and some oligomer. In the reaction of dimethyl terephthalate and ethylene glycol, catalysts such as manganese, zinc, cobalt or other conventional catalyst are employed. Next, the monomer and oligomer undergo a polycondensation reaction at the conditions stated above to form polyester or copolyester having an IV of about 0.7 to 0.85 dl/g.

Making copolyester of PET and a dicarboxylic acid merely requires the addition of the acid or its ester equivalent, for example, to also undergo an esterification (or transesterification) reaction. Making copolyester of PET and a diol merely requires the addition of the diol during esterification (or transesterification).

Polyester resins containing up to 20 wt. % of the dicarboxylic acid are useful in forming bottles or jar containers. Suitable diacids can be aliphatic, alicyclic, or aromatic dicarboxylic acids such as isophthalic acid, 1,4-cyclohexanedicarboxylic acid; 1,3-cyclohexanedicarboxylic acid, succinic acid, glutaric acid, adipic acid, sebacic acid, 1,12-dodecanedioic acid; 2,6-naphthalenedicarboxylic acid, bibenzoic acid, oxalic acid, malonic acid, pimelic acid, suberic acid, azelaic acid, maleic acid, fumaric acid, phthalic acid, hemimellitic acid, trimellitic acid, trimesic acid, or mixtures of these and their equivalents. It is often suitable to use a functional acid derivative equivalent such as dimethyl, diethyl, or dipropyl ester of the dicarboxylic acid.

Alternatively, polyester resins can optionally be modified by up to 20 wt. % of one or more different diols than ethylene glycol. Such additional diols include cycloaliphatic diols for example having 6 to 20 carbon atoms or aliphatic diols preferably having 3 to 20 carbon atoms. Examples of such diols to be included with ethylene glycol are: diethylene glycol, triethylene glycol, 1,2-cyclohexanedimethanol, 1,3-cyclohexanedimethanol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4 hydroxypropoxyphenyl)-propane.

In addition to polyester made from terephthalic acid (or dimethyl terephthalate) and ethylene glycol, or a modified polyester as stated above, the present invention also includes the use of 100% of an aromatic diacid such as 2,6-naphthalene dicarboxylic acid or bibenzoic acid, or their diesters, and a modified polyester made by reacting at least 85 mol-% of the dicarboxylate from these aromatic diacids/diesters with any of the above comonomers.

The composition of the present invention can further comprise an additive. The additive can be selected from heat stabilizers, anti-blocking agents, antioxidants, antistatic agents, UV absorbers, toners (for example pigments and dyes), fillers, branching agents, or other typical agents. For example the additive can be at least one member selected from the group consisting of a heat stabilizer, an anti-blocking agent, an antioxidant, an antistatic agent, a UV absorber, a pigment, a dye, a filler, a branching agent and mixtures thereof. The additive can be added to the composition generally during or near the end of the polycondensation reaction. Conventional systems can be employed for the introduction of additives to achieve the desired result.

This invention is based on adding a simple crystallization step, after the conditioning reactor, to the MTR process. A similar crystallizer as used in the SSP process can be used. A dry counter-flow of heated nitrogen is passed through a reactor in which the MTR resins are continuously fed at the top and removed at the bottom, then cooled to be transferred to the final storage silos. The resin temperature during the crystallization process and the residence time in the crystallizer are chosen to increase the crystallinity of the resins to greater than about 50%, preferably greater than 52%, more preferably greater than 54%, and most preferably greater than 55%, and such that the increase in IV is less than about 0.02 dl/g, and more preferably, less than 0.01 to 0.015 dl/g. The melt phase IV is greater than 0.50 dl/g, preferably greater than 0.60 dl/g, more preferably greater than 0.70 dl/g and most preferably >0.80 dl/g.

1) The IV of the polyester resin is measured using ASTM method D4603-96.
2) The crystallinity of the resins is calculated from the density measured with a pyncometer, using water at 23° C. The crystallinity being calculated by the equation $$X = \frac{\rho - \rho_a}{\rho_c - \rho_a} \times 100\%$$

where:

$\rho$=density of sample $\rho_a$ is the amorphous density of PET, 1.335 g·cm$^{-3}$ $\rho_c$ is the crystalline density of PET, 1.455 g·cm$^{-3}$ 3) The oligomer content of the resins is measured by GPC.

EXAMPLES

Comparative Example 1

This is a commercial non-solid state MTR PET sold by AlphaPet Inc., USA, type 1708

Comparative Example 2

This is standard melt phased intermediate IV (0.60 dl/g) polyester, underwater cut into spherical pellets, where the IV was increased by a standard crystallization and SSP process.

Inventive Example 3

Comparative Example 1 was a non-solid state PET resin processed through a crystallizer, with a low flow (0.002 kg/kg resin) of nitrogen at 215° C., with a residence time of 2 hours.

The physical properties of resins from these Examples are set forth in Table 1.

TABLE 1

|  | Comp. Ex. 1 | Comp. Ex. 2 | Inventive Ex. 3 |
| --- | --- | --- | --- |
| Melt-phase IV, dl/g | 0.80 | 0.60 | 0.80 |
| Final IV, dl/g | 0.80 | 0.80 | 0.81 |
| Crystallinity, % | 46 | 56 | 55 |
| Oligomer, wt.-% | 0.635 | 0.49 | 0.33 |

Inventive Example 3 shows that the crystallization process increases the crystallinity of the MTR resin to match that of a SSP resin, with a minimum increase in IV, but with significant lower oligomer content. While the process conditions of a low flow rate (0.002 kg/kg resin) of nitrogen at 215° C., with a residence time of 2 hours, for Example 3 are noted, those skilled in the art realize these conditions can have a flow rate lower or higher, a temperature that is lower or higher and a residence time that is longer or shorter, depending on the equipment size.

Thus, it is apparent that there has been provided, in accordance with the invention, a process for manufacturing a non-solid state polyester resin with reduced oligomer content and a non-solid state polyester resin with reduced oligomer content. Preferably the oligomer content is less than about 0.5 wt. % of the resin. These inventions fully satisfy the objects, aims, and advantages set forth herein. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A method of making a non-solid state polyester, comprising:
    a) reacting terephthalic acid and ethylene glycol at a temperature of approximately 200° to 250° C. forming monomer and water,
    b) removing the water continuously driving the reaction in (a),
    c) polymerizing the monomers and oligomers in vacuum conditions at a temperature of about 250° to 290° C. to form molten polyester having an IV (intrinsic viscosity) of about 0.7 to 0.85 dl/g, and
    d) extruding the molten polyester through a die, and
    e) cutting and quenching the molten polyester, forming polyester pellets, and
    f) drying the polyester pellets to about 165° C. and transferring the polyester pellets to a storage vessel and maintained at about 165° C. with a flow of hot air to complete a latent heat crystallization process with a residence time of about 15 to 60 minutes, and
    g) transferring the polyester pellets to the upper end of a conditioning vessel while a countercurrent flow of air is circulated through the polyester pellets as the polyester pellets fall to a bottom of the conditioning vessel, and
    h) transferring the polyester pellets to the top of a crystallizer vessel to form a bed of polyester pellets flowing by gravity towards the bottom of the vessel while a countercurrent flow of nitrogen at a temperature about 215° C. is circulated through the bed, and heating the polyester pellets with a residence time of about 2 hours, wherein increase of the IV of the polyester pellets is less than about 0.01 to 0.015 dl/g and the polyester pellets have a crystallinity greater than about 52%.

2. A method of making a non-solid state polyester according to claim 1, wherein the polyester pellets have an oligomer content less than about 0.5 weight percent of the polyester pellet.

* * * * *